Figure 1:
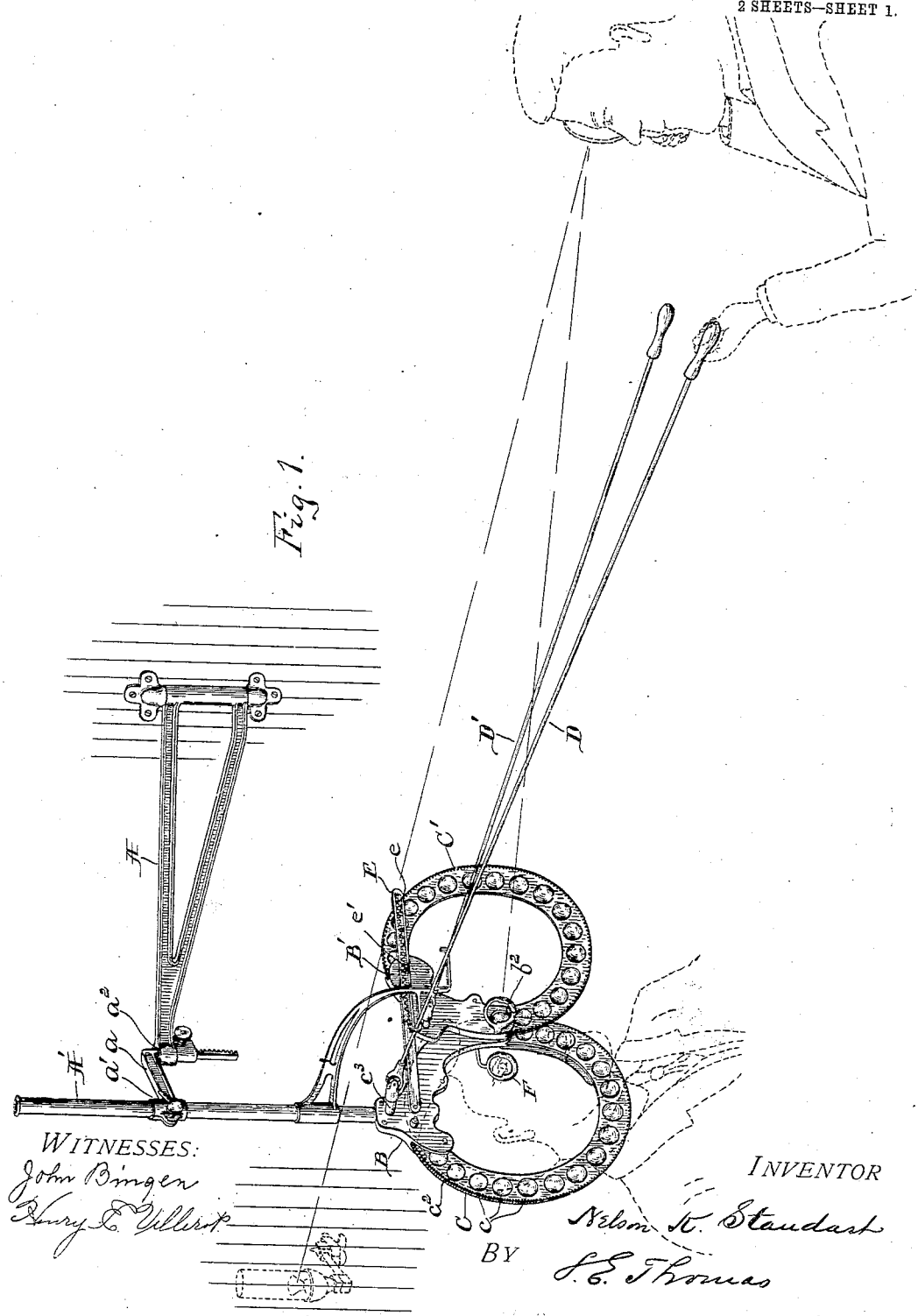

No. 852,857.

PATENTED MAY 7, 1907.

N. K. STANDART.
SKIAMETER.
APPLICATION FILED AUG. 22, 1906.

2 SHEETS—SHEET 1.

WITNESSES:
John Bingen
Henry T. Villirot

INVENTOR
Nelson K. Standart
BY
S. E. Thomas
Attorney

No. 852,857. PATENTED MAY 7, 1907.
N. K. STANDART.
SKIAMETER.
APPLICATION FILED AUG. 22, 1906.
2 SHEETS—SHEET 2.
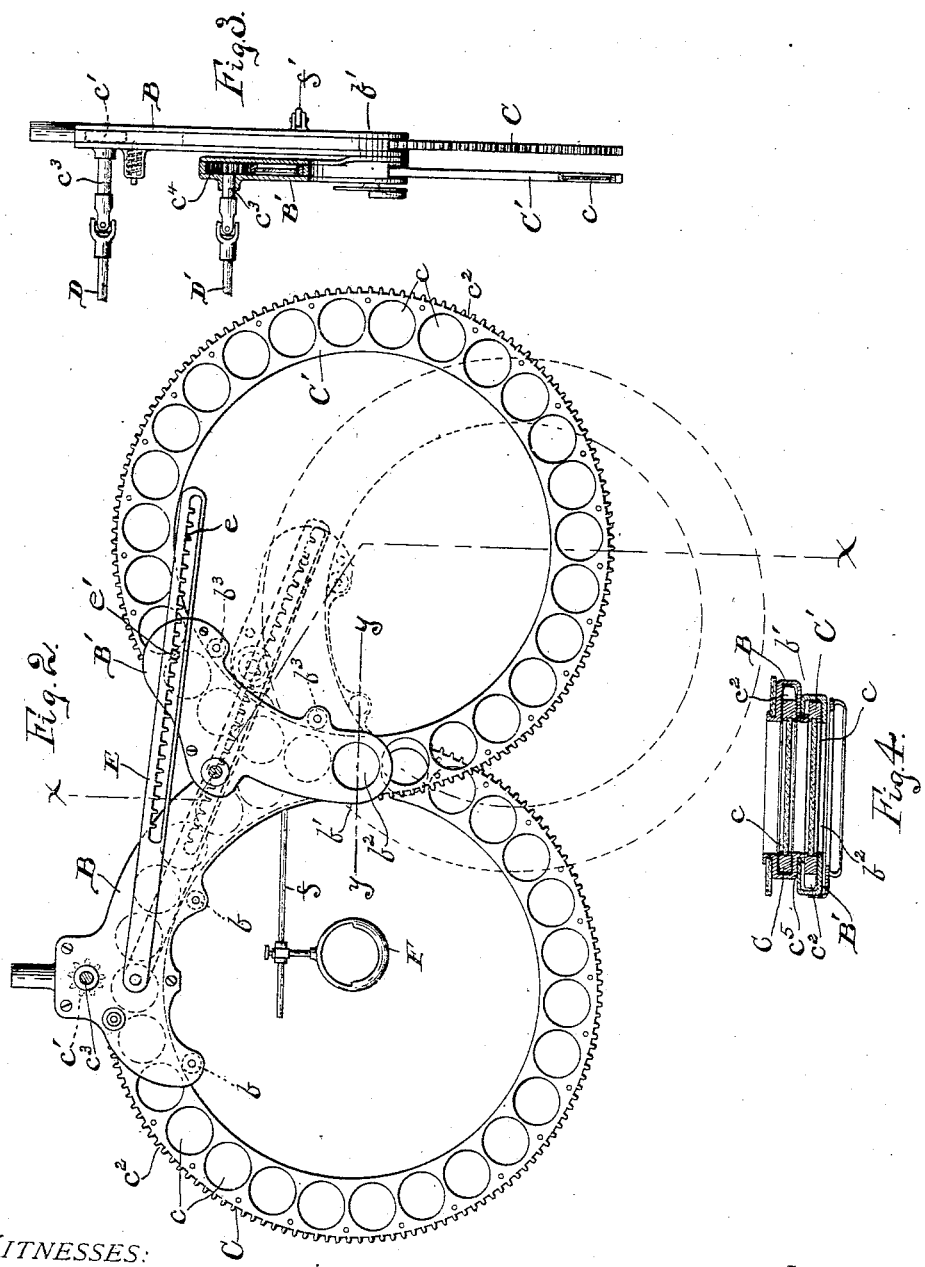
WITNESSES:
John Bingen
Henry E. Villerot
INVENTOR
Nelson K. Standart
BY J. E. Thomas
Attorney

UNITED STATES PATENT OFFICE.

NELSON K. STANDART, OF DETROIT, MICHIGAN.

SKIAMETER.

No. 852,857.　　　Specification of Letters Patent.　　　Patented May 7, 1907.

Application filed August 22, 1906. Serial No. 331,557.

*To all whom it may concern:*

Be it known that I, NELSON K. STANDART, a citizen of the United States, residing at Detroit, county of Wayne, State of Michigan, have invented a certain new and useful Improvement in Skiameters; and I declare the following to be a full, clear, and exact description of the same, such as will enable others skilled in the art to which it pertains to make and use the same, reference being had to the accompanying drawings, which form a part of this specification.

My invention relates to improvements in optical instruments and more particularly skiameters, and consists in improved means for holding and adjusting the several lenses.

The object of my invention is to increase the facility with which spherical and cylindrical lenses may be combined before one eye without interfering with the other. My invention accomplishes this by doing away with spokes or flat disk surfaces, and other obstructions to the sight, usually found in optical instruments of this class.

My invention is shown in the accompanying drawings in which:

Figure 1 is a view of the means for and manner of supporting and operating the instrument; Fig. 2 is an elevation showing details of construction and in which certain parts are shown in dotted lines to illustrate the operation; Fig. 3 is a vertical sectional view on line $x$—$x$ of Fig. 2, and, Fig. 4 is a sectional view on line $y$—$y$ of Fig. 2.

In the drawings, A is a bracket in which the apparatus is adjustably supported through the vertical rod A'. This rod is provided with an arm $a$ with which the rod is adjustably connected at $a'$, the end of the arm being pivoted in the end of the bracket at $a^2$. Rigidly attached to the lower end of the rod A' is a hollow frame B, and in this frame is mounted an annular ring C provided with openings $c$ in which to support the several lenses used.

The ring C is provided on its outer periphery with a series of teeth $c^2$ and is supported in the frame B by a three point support consisting of the rolls $b$, $b$, that support the ring on the under side and by the small pinion $c'$ that engages with the teeth $c^2$ on the upper side. The pinion $c'$ is attached to a short shaft $c^3$, which is operated by a rod D in such manner that the operator, by turning the rod D, will cause the ring C to rotate in the frame. By this construction, it will be seen that the center of the ring is left clear.

B' is a second frame somewhat similar in construction to the frame B, but is supported from the frame B by pivoting the two frames together at $b'$. The engagement between these frames is made by a pivot $c^5$ around a sight-opening $b^2$, as shown in Fig. 4, so that in whatever adjustment the parts may be, this sight-opening is common to the two rings carried by the frames B and B'.

The ring C' is exactly the same as the ring C and is carried on the rollers $b^3$, $b^3$, and the gear $c^4$, so that by turning the rod D', the operator may turn the ring C' so as to bring any one of the lenses supported in the ring to the opening $b^2$ in the same manner that he may bring any one of the lenses in the ring C to the same opening and thereby unite any lens in one ring with any lens in the other ring. By means of tilting the ring C' in its frame up or down, the combination of the cylindrical and spherical lenses in any meridian from zero to one-hundred-and-eighty degrees can be secured.

By adjusting the ring C' around its pivot $c^5$, in the manner shown in dotted lines in Fig. 2, the angle between the lenses in the ring C' can be changed relative to the lenses in ring C. In order to hold the ring C' in any position to which it may be adjusted in the manner described, I employ the adjusting link E, provided with interior teeth $e$ arranged to engage with the pin $e'$. These teeth $e$ are so spaced as to provide for changing the angle of the lenses a definite degree.

F is a lens holder supported on the horizontal rod $f$ and is designed to receive a fogging lens. The supporting rod $f$ is pivoted at $f'$ so that the lens holder can be swung from one side to the other, so as to test or fog either eye. The holder is made adjustable on the rod so as to provide for spacing. This lens holder F can be used for making any test desired and lenses of any character may be used on it, the holder for this purpose being in the nature of a trial frame.

In the operation of the device, in the diagnosis of errors of refraction by skiascopy, a mirror, either plane or concave, is used at a distance of about one meter, as shown in Fig. 1.

In operating my invention, the patient is seated in a chair, and the opening $b^2$ of the instrument is brought exactly in front of the eye of the patient, the eye not under examination being covered with the fogging lens. A light is brought exactly over the top of the head of the patient and the operator is seated one-meter in front with a mirror in hand. Light coming from the original source is reflected on the mirror through the lens of the skiameter into the eye of the patient, the retina of the patient's eye serving as a second reflector, which brings back the ray to the eye of the operator, perceived through a small opening in the center of the mirror. As the movement of the shadow is noted, lenses of the proper power are brought in front of the patient's eye by means of the rod D until a neutralization is accomplished. The power of the correcting lens is then read according to the indication on the instrument.

What I claim is:—

1. In a skiameter, an annular ring arranged to support a series of lenses, a supporting frame, and rolls in the frame between which the ring travels to give it an annular movement, substantially as described.

2. In a skiameter, a ring arranged to support a series of lenses, a supporting frame, two or more rolls on one side of the ring, and a pinion on the opposite side of the ring engaging with an annular rack for giving the ring an annular movement through the frame, substantially as described.

3. In a skiameter, a supporting frame, a ring arranged to support a series of lenses having an annular movement through said frame, a second frame pivoted to the first frame, a second ring arranged to support a series of lenses arranged to have an annular movement through said second frame, and means for operating the rings, substantially as described.

4. In a skiameter, a pair of annular rings free of spokes or disk surfaces each arranged to support a series of lenses, supports for the annular rings, and means for moving the rings through the supports and bringing the lenses in one ring over the lenses in the other ring, substantially as described.

5. In a skiameter, an annular ring arranged to support a series of lenses, a supporting frame arranged to allow an annular movement of the ring through the frame, an opening through the frame arranged to register with the lenses, a second frame pivoted around said opening, a second annular ring arranged to move through said second frame by an annular movement, whereby the several lenses in the two rings may be made to successively register with said opening, substantially as described.

6. In a skiameter, an annular ring arranged to support a series of lenses, a supporting frame arranged to allow an annular movement of the ring through the frame, an opening through the frame arranged to register with the lenses, a second frame pivoted around said opening, a second annular ring arranged to move through said second frame by an annular movement, whereby the several lenses in the two rings may be made to successively register with said opening, and means for adjusting said frames, substantially as described.

7. In a device of the class described, a lens support for a fogging glass for the eye not being tested, and a rod with which the support is engaged arranged to swing the lens support from one side of the device to the other, substantially as described.

8. In a skiameter, a pair of annular rings each arranged to support a series of lenses, frames through which the rings travel by an annular movement, said frames pivoted together over an opening with which the lenses of each ring register by which the angle at which the lenses of the two rings come together may be changed, and a connecting rod for holding the frame in adjustment, substantially as described.

In testimony whereof, I sign this specification in the presence of two witnesses.

NELSON K. STANDART.

Witnesses:
 JOHN C. STEPHENS,
 HENRY E. VILLEROT.